(12) United States Patent
Weyer et al.

(10) Patent No.: US 8,499,047 B2
(45) Date of Patent: Jul. 30, 2013

(54) METHOD, APPARATUS AND BUSINESS SYSTEM FOR ONLINE COMMUNICATION WITH ONLINE AND OFFLINE RECIPIENTS

(75) Inventors: Frank Michael Weyer, Los Angeles, CA (US); Troy Kurosh Javaher, Modesto, CA (US)

(73) Assignee: Everymo LLC, Los Angeles, CA (US)

( * ) Notice: Subject to any disclaimer, the term of this patent is extended or adjusted under 35 U.S.C. 154(b) by 551 days.

(21) Appl. No.: 12/621,407

(22) Filed: Nov. 18, 2009

(65) Prior Publication Data

US 2010/0064020 A1    Mar. 11, 2010

Related U.S. Application Data

(63) Continuation of application No. 11/623,132, filed on Jan. 15, 2007, now Pat. No. 7,644,122, which is a continuation of application No. 10/747,881, filed on Dec. 29, 2003, now abandoned, which is a continuation of application No. 09/447,755, filed on Nov. 23, 1999, now Pat. No. 6,671,714.

(51) Int. Cl.
   *G06F 15/16*    (2006.01)
(52) U.S. Cl.
   USPC ............................ 709/206; 709/207; 709/226
(58) Field of Classification Search
   USPC .......................................... 709/206, 207, 226
   See application file for complete search history.

(56) References Cited

U.S. PATENT DOCUMENTS

| | | | | |
|---|---|---|---|---|
| 5,813,007 A | * | 9/1998 | Nielsen | 1/1 |
| 5,822,526 A | * | 10/1998 | Waskiewicz | 709/206 |
| 6,161,129 A | * | 12/2000 | Rochkind | 709/206 |
| 6,363,414 B1 | * | 3/2002 | Nicholls et al. | 709/206 |
| 6,628,194 B1 | * | 9/2003 | Hellebust et al. | 340/7.5 |
| 7,392,039 B2 | * | 6/2008 | Souissi et al. | 455/412.2 |
| 7,663,652 B1 | * | 2/2010 | Reese | 715/744 |
| 2004/0230644 A1 | * | 11/2004 | Aratake | 709/201 |
| 2006/0079211 A1 | * | 4/2006 | Degraeve | 455/412.1 |

* cited by examiner

*Primary Examiner* — David Lazaro
(74) *Attorney, Agent, or Firm* — TechCoastLaw; Frank Michael Weyer

(57) ABSTRACT

The present invention comprises a method, apparatus and business system for allowing on-line communications with members of a group of recipients for whom the invention has been implemented. A group may, for example, comprise members of a particular business or profession. For example, a group may consist of doctors admitted to practice medicine in the United States. Individual members of the group may or may not have existing internet presences. The invention allows online users to communicate with each member of a given group regardless of whether or not the member has an existing internet presence. In one or more embodiments, the invention does so by setting up a database of contact information for members of the group, creating an internet presence for each member of such group, creating an on-line user interface allowing a user to access the member's created internet presence, and providing means of communications between the created internet presence and the member recipient.

6 Claims, 10 Drawing Sheets

Figure 2

EVERYMD.COM

*210*

Please enter your name and contact information:

First [Jane] MI [M] Last [Doe]
Address1 [1234 First St.]
Address2 [ ]
City [Anytown] State [CA] Zip [12345]
Phone [(222) 111-2345]
E-Mail [jdoe2@techcoastcorp.com]

*205*

Please enter the name, city, and state, and street (if known) of the doctor you would like to contact First [John] MI [S] Last [Smith]
City [Big City] State [CA]
Street (if known) [Main St.]

[Visit Website]
*230*

Please enter any message you would like to send below:
(a copy of your message will be sent to your e-mail address as indicated above)

*215*

Dear Dr. Smith,
My ankle is still very painful. Would you be able to see me any time this Thursday or Friday? Afternoons would be best for me.
Thank you.
Jane Doe

*220*
[Clear] *225*
[Send]

```
 ┌─900
 │                  DRJSMITH.EVERYMD.COM   ┌─905
910
 └ Dr. John S. Smith              Rating: Not yet rated
   2356 Main Street
   Big City, CA 99921                          ┌915
   Tel: 333/234-5566              [ View map  ]
   E-mail: drjsmith@everymd.com                 920
                                  [ Send E-mail ]
                                                925
   Field of Practice: Orthopedics [ Post Comment]

Education:   Harvard Medical School, MD 1987
                Yale, BS Biology 1979

Member:                                     935
                California Medical Association  [ More ]
                American Medical Association
                American College of Orthopedic Surgeons 930
              [ Return to EVERYMD.COM Homepage ]
```

METHOD, APPARATUS AND BUSINESS SYSTEM FOR ONLINE COMMUNICATION WITH ONLINE AND OFFLINE RECIPIENTS

CROSS-REFERENCE TO RELATED APPLICATIONS

This patent application is a continuation of pending U.S. patent application Ser. No. 11/623,132 entitled "Method, apparatus and business system for online communications with online and offline recipients," filed Jan. 15, 2007 issued Jan. 5, 2010 as U.S. Pat. No. 7,644,122, which is a continuation of pending U.S. patent application Ser. No. 10/747,881 entitled "Method, apparatus and business system for online communications with online and offline recipients," filed Dec. 29, 2003, now abandoned, which is a continuation of U.S. patent application Ser. No. 09/447,755 entitled "Method, apparatus and business system for online communications with online and offline recipients," filed Nov. 23, 1999, issued Dec. 30, 2003 as U.S. Pat. No. 6,671,714.

FIELD OF THE INVENTION

The present invention relates to the field of online communications, and more particularly to a method, apparatus, and business system for online communications with diverse online and offline recipients.

BACKGROUND OF THE INVENTION

The internet is rapidly becoming a preferred means of communication for professionals, businesses and consumers. Communications conducted via the internet include sending and receiving e-mail messages and disseminating information via web sites. But even for the most "wired" businesses and professions, internet usage is less than 100%. Accordingly, heretofore there has always existed a degree of uncertainty as to whether an internet user who wishes to communicate with a given business or professional (such as, for example, a doctor or a dentist) via the internet will be able to do so because the intended recipient may or may not have an existing internet presence that can receive the user's online communication.

Even if the intended recipient has an appropriate internet presence, a second element of uncertainty exists with respect to locating the proper e-mail address or website URL for the intended recipient. Although a number of online search and directory services exist that are intended to help a user locate the website or e-mail address of a business or person with which the user desires to communicate, use of such directories is tedious and often unsuccessful.

The present invention overcomes the limitations of the prior art by providing a method, apparatus and business system that allow a user to quickly communicate online with a member of a particular business, professional or other group regardless of whether the member has an internet presence (e.g. e-mail address or website) and without the user needing to know or find the internet address for the recipient.

SUMMARY OF THE INVENTION

The present invention comprises a method, apparatus and business system for allowing on-line communications with members of a group of recipients for whom the invention has been implemented. A group may, for example, comprise members of a particular business or profession. For example, a group may consist of doctors admitted to practice in the United States. Individual members of the group may or may not have existing internet presences (as used herein, the term "internet presence" refers to an internet e-mail address and/or website, or other means for receiving or sending communications via the internet). The invention allows online users to communicate with each member of a given group regardless of whether or not the member has an existing internet presence. In one or more embodiments, the invention does so by setting up a database of contact information for members of the group, creating an internet presence for each member of such group, creating an on-line user interface allowing a user to access the member's created internet presence, and providing means of communications between the created internet presence and the member recipient. The invention allows a user to communicate with an intended recipient who is a member of a group for which an embodiment of the invention has been implemented using the created internet presence, regardless of whether or not the recipient has a pre-existing internet presence. In one or more embodiments, if the recipient has a pre-existing internet presence, online communications from a user are transparently forwarded from the created internet presence to the recipient's existing internet presence. In one or more embodiments, a "reply to" address is created for a sender/user and added to e-mail messages sent by the user so that any reply message from the recipient will be returned to the sender via the sender's created address. In one or more embodiments, when a sender's e-mail message is replied to by the recipient, the reply message's "reply-to" address is replaced with a created e-mail address for the recipient, so that the reply appears to have been sent from the recipient's created e-mail address even if it has been sent from a different e-mail address. In one or more embodiments, if an intended recipient has no preexisting internet presence, online communications from a user are converted into one or more forms of offline communications, according to information contained in the contact database. For example, in one or more embodiments, e-mail messages from a user sent via the created internet presence of an offline recipient are converted to fax messages, voice-mail messages, or other off-line forms of communications (as used herein, the term "online" refers to communications via the internet, whereas the term "offline" refers to non-internet communications), as appropriate. In one or more embodiments, means are provided for receiving reply messages from an offline recipient via offline means, converting such messages to online messages, and delivering them to the original user with the appearance of having originated from the created internet presence of the original recipient.

BRIEF DESCRIPTION OF THE DRAWINGS

FIG. 2 shows an example of a user interface that may be used with one or more embodiments of the invention.

FIG. 3 shows the user interface of FIG. 2 with information that has been entered by a user.

FIG. 9 shows an example of a member webpage that may be used with one or more embodiments of the invention.

DETAILED DESCRIPTION OF THE INVENTION

The present invention comprises a method, apparatus and business system for conducting online communications with online and offline recipients. In the following description, numerous specific details are set forth to provide a thorough description of the invention. However, it will be apparent to one skilled in the art that the invention may be practiced without these specific de ails. In other instances, well-known features have not been described in detail so as not to obscure the invention.

The present invention allows a user (also sometimes referred herein as a "sender") to communicate via the internet with a recipient who is a member of a group for which the invention has been implemented. For example, the group may be all doctors admitted to the practice of medicine in the United States, and the user may be a patient who would like to communicate via e-mail with his or her doctor. The patient does not need to know the e-mail address or website URL of the intended recipient, and the intended recipient may or may not have an existing e-mail address and/or web site URL.

In the following discussion, the invention will at times be described with respect to a patient wishing to communicate with a doctor. However, it will be apparent to those skilled in the art that the invention is not limited to patients communicating with doctors, but may be used for facilitating online communications with members of any group for which the invention has been implemented.

Figure 1:
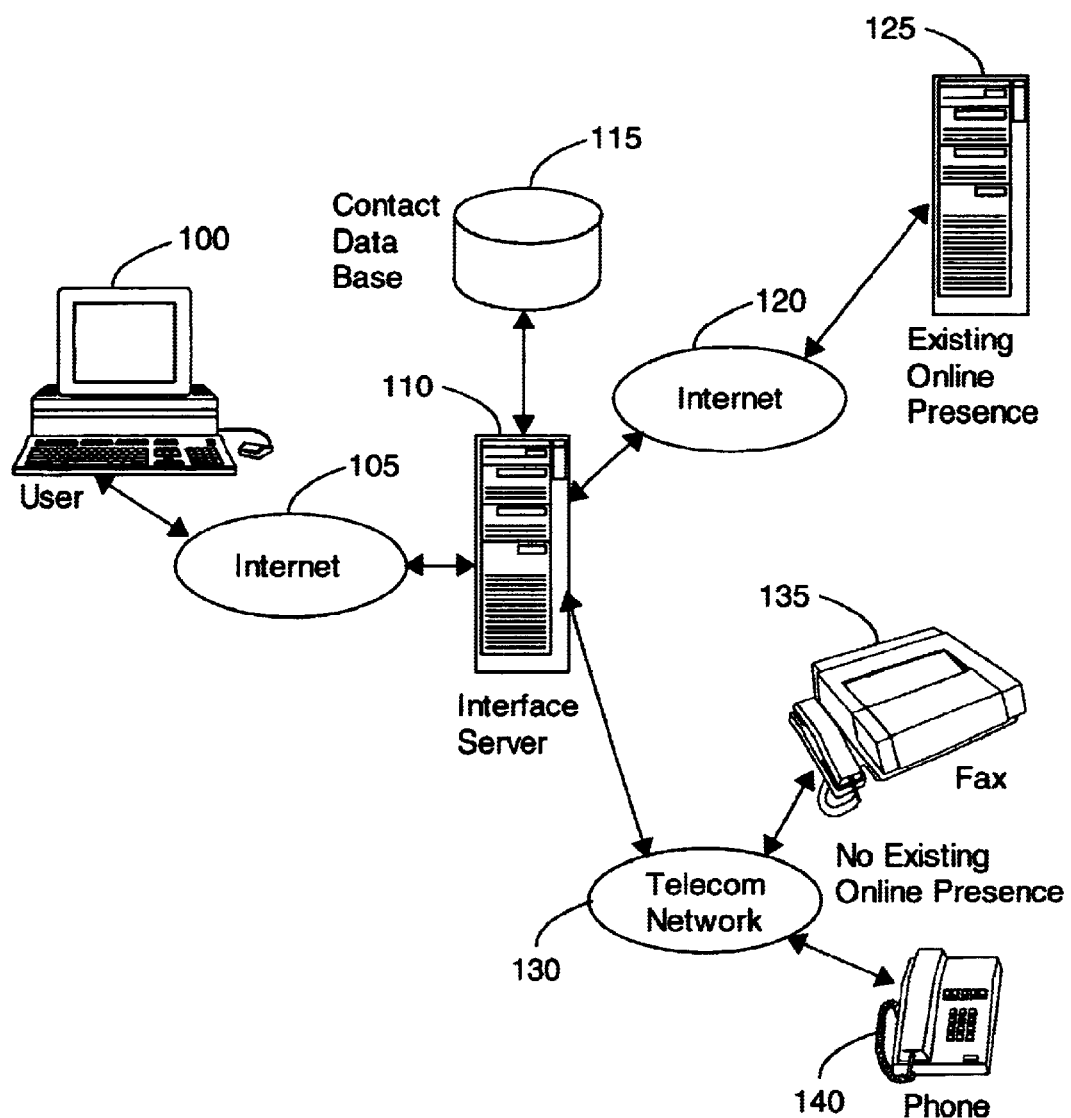
FIG. 1 is a schematic diagram illustrating functional components of an embodiment of the invention.

FIG. 1 is a schematic diagram showing components used in an embodiment of the invention. In the embodiment of FIG. 1, a user who wants to communicate with a recipient uses the user's computer 100 and an internet connection 105 to communicate with an interface server computer 110. In one or more embodiments, the user utilizes a web browser such as Netscape Navigator or Microsoft Internet Explorer running in user computer 100 to access a website hosted by interface server 110 (interface server 110 may be implemented as a dedicated server computer, a virtual server hosted by an internet service provider ("ISP"), as a system of multiple interconnected computers, or may be implemented in any other appropriate manner). Interface server 110 provides an interface to user computer 100 (for example in the form of one or more web pages) that allows the user to select the intended recipient and specify the form of communication the user would like to use (e.g. sending an e-mail message or visiting the recipient's web site).

Interface server 110 is connected to a contact data base 115 that contains contact information for one or more groups of recipients. Data base 115 may be directly connected to interface server 110, or may be connected to interface server 110 by the internet or by any other network or other telecommunications means. Data base 115 may comprise a data base server system, data base files accessible by a data base manager program, or any other form of data base system that can store and retrieve contact information. In one or more embodiments, contact data base 115 comprises a plurality of data sources that can be searched by interface server 110 for contact information. For example, contact data base 115 may comprise one or more online directory servers, such as, for example, www.411.com or www.switchboard.com, that can be searched by interface server 110. Furthermore, contact data base 115 need not comprise a separate system but may be integrated into interface server 110.

In addition to user computer 100, interface server 110 and contact data base 115, the embodiment of FIG. 1 also includes various means by which a recipient may receive communications from a user (the terms "user" and "sender" are used interchangeably herein). In the embodiment of FIG. 1, these means include a recipient computer or other internet access device 125, a recipient fax machine 135, and a recipient telephone 140. Internet access device 125 may be used when a recipient has an appropriate existing online presence. Fax machine 135 and telephone 140 may be used when a recipient does not have an appropriate existing online presence. It will be noted that these recipient communications devices are examples only and any other kind of communications devices may also be used. An "appropriate existing online presence" is an existing e-mail address or website known and accessible to the interface server 110. The embodiment of FIG. 1 also includes communications means such as an internet connection 120 and a telecommunications connection 130 by which interface server 110 can send communications to the recipients' communications devices 125, 135 and 140.

Figure 5:
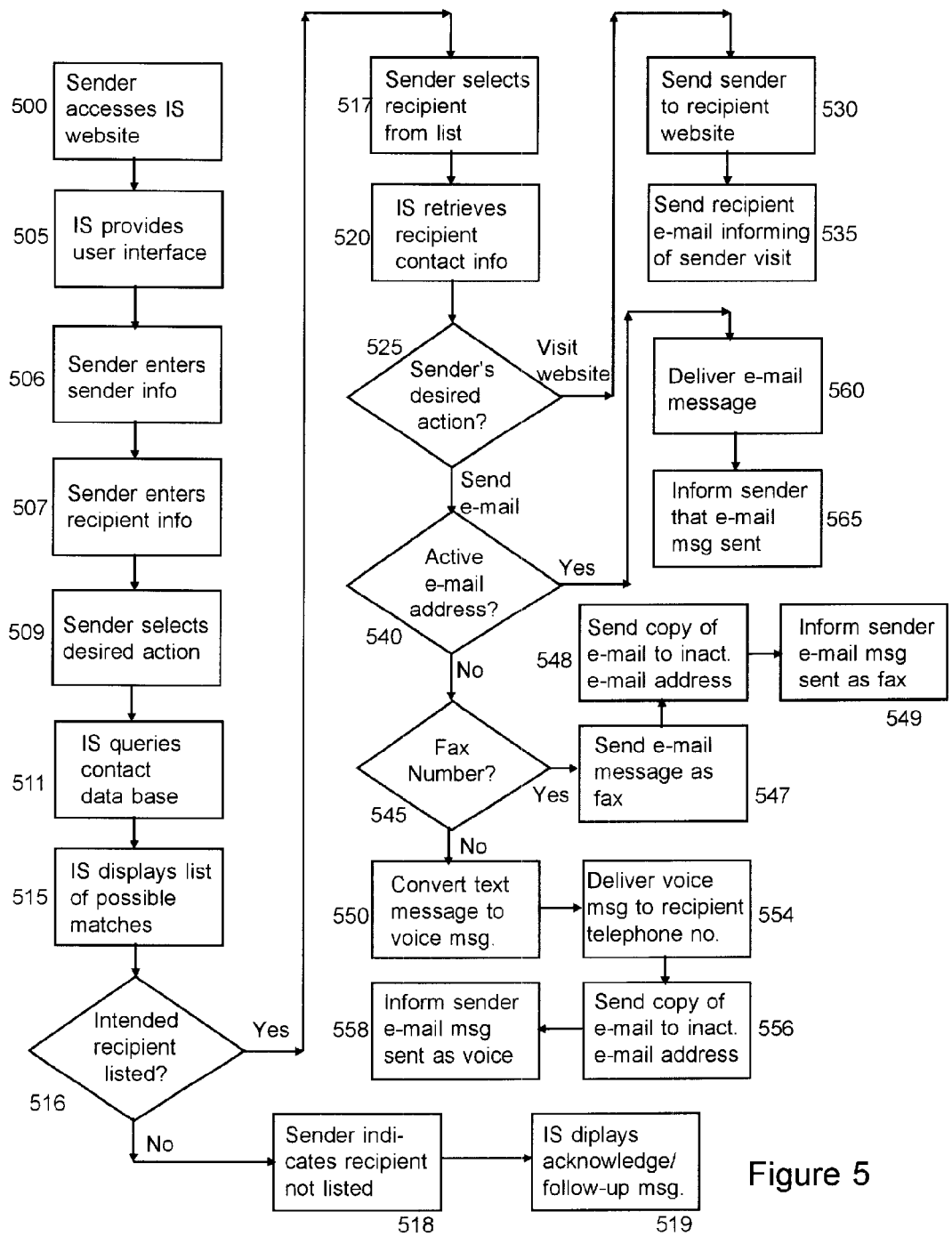
FIG. 5 is a flow chart showing method steps used in an embodiment of the invention.

FIG. 5 is a flow chart showing method steps used for sending a communication from a user/sender to a recipient using an embodiment of the invention. As shown in FIG. 5, the process starts when a sender wishing to communicate with a member of a group for which the invention has been implemented accesses the interface server's web site at step 500. The sender may access the interface server's web site, for example, by using the sender's computer, internet connection and browser software and specifying the interface server's URL. For example, in one embodiment of the invention in which the group for which the invention has been implemented is doctors licensed to practice medicine in the United States, the sender may access the interface server's website by specifying the URL "www.everymd.com." In the discussion below, the interface server's URL is sometimes referred to as "www.interfaceserver.com". However, any other URL may be used. It will be noted that the sender may abort the process of FIG. 5 at any time by going to a different URL, exiting the user's browser software, or otherwise terminating the sender's connection with the interface server.

Upon receiving a request from the sender to access the interface server's website, the interface server provides a user interface to the sender at step 505. The interface may, for example, be provided in the form of a webpage that utilizes hypertext markup language (HTML).

After receiving the user interface (for example in the form of HTML code) from the interface server, the sender enters information into appropriate fields as indicated in the user interface. For example, in the embodiment of FIG. 5, the sender enters identifying information for the sender at step 506 and identifying information for the recipient at step 507. For example, the sender may enter the sender's name, telephone number, and e-mail address at step 506 and the last name, city and state of the desired recipient at step 507. If known, the sender may also provide additional information, such as the recipient's street address or street name. In one or more embodiments, if the sender has previously visited the interface server's website, some or all of the sender's previously entered sender and recipient identifying information may be retrieved using "cookies" previously set by the interface server.

After entering the recipient identifying information at step 507, the sender selects the desired action from choices provided by the user interface at step 509. In one or more embodiments, the choices provided by the user interface include visiting the recipient's website (for example to obtain additional information about the recipient) and sending the recipient an e-mail message. If the sender's desired action is to send an e-mail message, the selection step 509 includes the sender entering the desired e-mail message.

Figure 2:
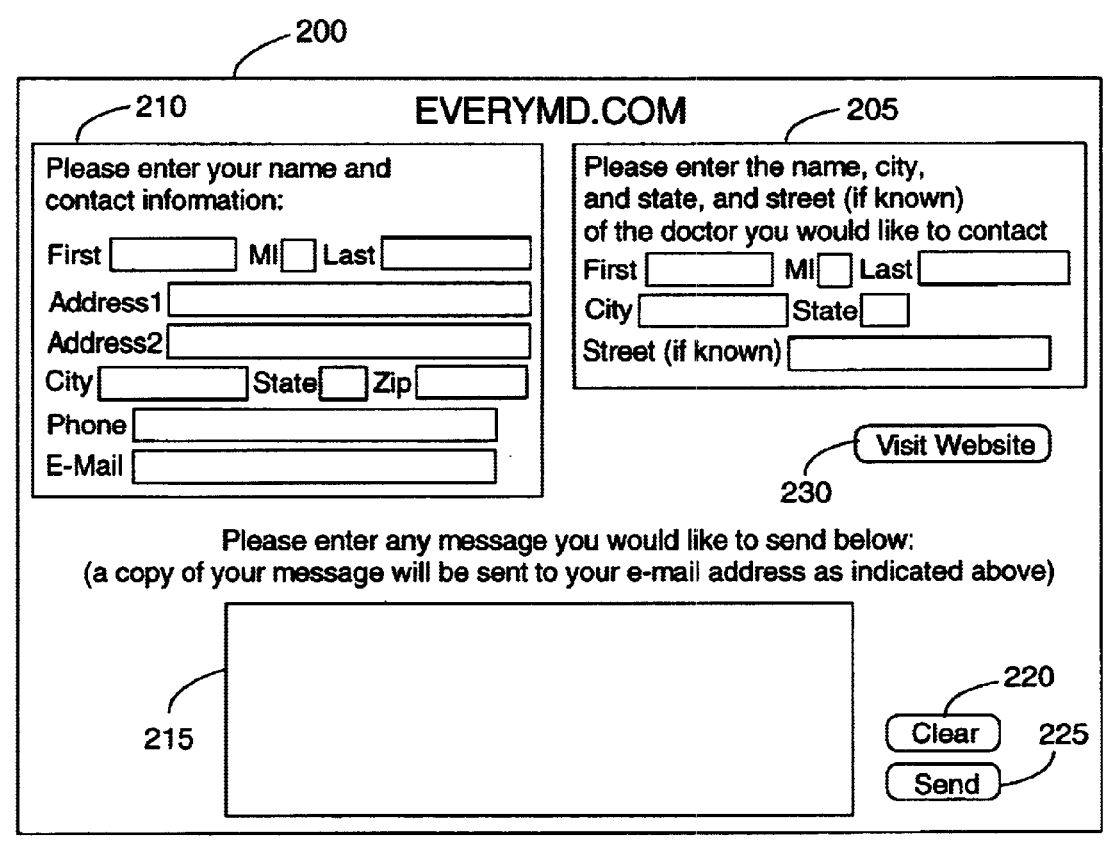

FIG. 2 shows an example of a user interface 200 that may be used in one or more embodiments of the invention. The user interface of FIG. 2 is for an embodiment of the invention that has been implemented for a group that comprises doctors admitted to practice medicine in the United States. In this example, the URL of the interface server is "EVERYMD.COM." In the embodiment of FIG. 2, user interface 200 includes a sender information entry area 210, a recipient information entry area 205, an e-mail message text entry area 215, and control buttons 220, 225, and 230. To use interface 200 of FIG. 2, a user enters the user's name, address, phone number and e-mail address in the appropriate text fields in sender information area 210. The sender also enters the name, city, state, and street location, if known, of the intended recipient (who, in the example of FIG. 2, is a doctor) in the appropriate fields of recipient information area 205. If the user wants to send an e-mail message to the recipient, the user may also enter e-mail message text into e-mail message text entry area 215. The user may clear any text entered into text entry area 215 by clicking on "Clear" control button 220.

FIG. 3 shows an example of user interface 200 after information has been entered by a user into entry areas 210, 205 and 215. After the information is entered by the sender, the sender may select the sender's desired action. The user may click on "Visit Website" control button 230 to visit the recipient's website, or on "Send" control button 225 to send the e-mail message entered in e-mail message entry area 215 to the recipient.

Returning to FIG. 5, at step 511, the interface server queries the contact data base using the recipient identifying information provided by the user to determine whether the intended recipient is found in the contact data base. In one or more embodiments, the data base will return exact matches and close matches. In one or more embodiments, the data base will always return at least one closest match.

Figure 4:
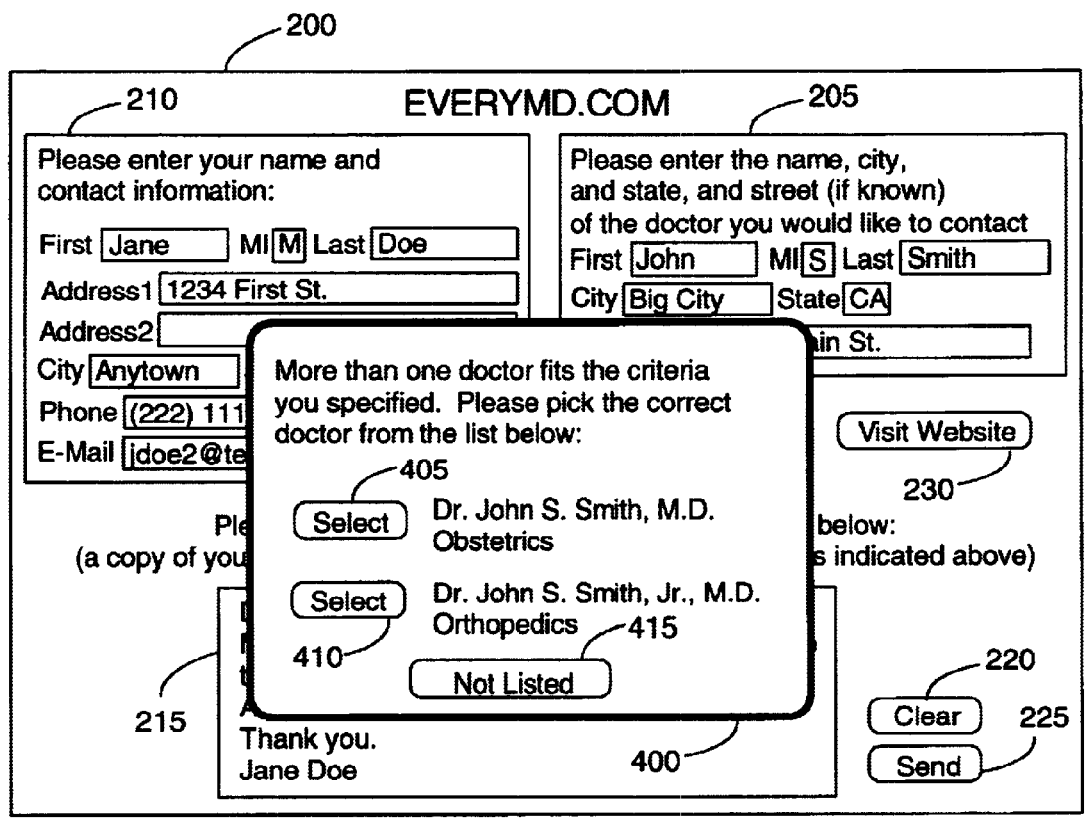
FIG. 4 shows the user interface of FIG. 3 after a dialog box has appeared.

At step 515, the interface server provides a list of the possible recipients retrieved from the data base to the user. An example of such a list is shown in FIG. 4 as pop-up box 400. At step 516, the user examines the list and determines whether or not the desired recipient is listed. If the intended recipient is not listed, the sender indicates that the recipient is not listed at step 518 (for example by clicking on "Not Listed" button 415 of FIG. 4), and the interface server displays a message to the sender acknowledging that the recipient was not found. In one or more embodiments, the interface server may display a message requesting additional information about the intended recipient and offering to attempt to locate the intended recipient within 24 hours or some other period of time.

If the intended recipient is on the list, the sender selects the intended recipient (for example by moving a cursor over the name of the intended recipient and clicking a button on a cursor control device such as a mouse, or by clicking on one of selection buttons 405 and 410 of FIG. 4) at step 517. At step 520 the interface server retrieves contact information for the selected recipient from the contact data base. For example, the contact information may include an indication of whether or not the recipient has an existing website or e-mail address, and, if so, identify the URL of the existing website or the existing e-mail address. The contact information data base may also include additional information, such as a count of the number of times that a particular recipient has been contacted via the facilities provided by the interface server, whether the recipient has replied, whether the recipient has indicated a preferred mode to be contacted, etc.

In the embodiment of FIG. 5, after step 520, a determination is made at step 525 as to whether the sender's desired action is to send an e-mail message or to visit the recipient's website.

If the action selected by the sender is to visit the recipient's webpage, the method continues at step 530. At step 530, the sender's browser is linked to the recipient's website and the recipient's home page displayed on the sender's browser, as is well known in the art. The recipient's website may be an existing website of the recipient, or may be a website that has been created for the recipient, for example using the method described below with respect to FIG. 6. In one or more embodiments of the invention, if the website that is displayed is a pre-existing website (as opposed to a created website) the recipients website is displayed in a frame, with another frame containing navigational controls allowing the sender to easily return to the interface server's website. At step 535, the interface server sends the recipient an e-mail informing the recipient that a sender has visited the recipient's website. The e-mail may be sent, for example, using the methods for sending e-mail of the invention. Where the recipient's website that has been visited is a created website, the e-mail may also contain instructions informing the recipient of how the recipient may access, and/or edit, and/or otherwise modify or provide additional information for the recipient's created website. The e-mail message in one or more embodiments may also contain information describing services provided by the interface server.

If the sender's action selected at step 509 is to send an e-mail message, after step 525, the embodiment of FIG. 5 continues from step 525 to step 540. At step 540, the interface server inspects the contact data for the intended recipient received at step 520 to determine whether the recipient has an active e-mail address. An "active" e-mail address is an address that is known to have been actually used by the recipient. An "active" e-mail address is distinguished herein from an e-mail address that has been created by for the recipient but that has not yet been accessed by the recipient. As described in greater detail below, in one or more embodiments of the invention, an e-mail box is created for each member of the group for which the invention is being implemented. If the member is known to be using a different e-mail address, the created e-mail box may be linked to the existing e-mail box such that e-mail messages sent to the created e-mail box are automatically forwarded to the existing e-mail box. An e-mail box is considered to be inactive if it has been created for a recipient, but has not yet been accessed by the recipient.

If it is determined at step 540 that the recipient has an active e-mail address, the sender's e-mail message is delivered to that e-mail box at step 560, and a message informing the sender that the e-mail message has been delivered to the recipient is delivered at step 565. The message delivered to the sender may include a statement that although the sender's message has been delivered to the recipient's e-mail address, there is no guarantee that the recipient will actually read the message.

Figure 8A:
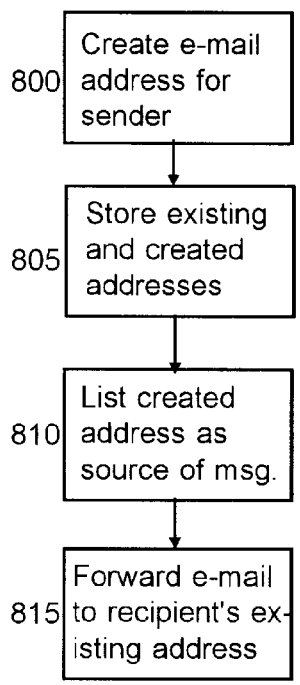
FIGS. 8A and 8B are flow charts showing method steps used in an embodiment of the invention.
Figure 8B:
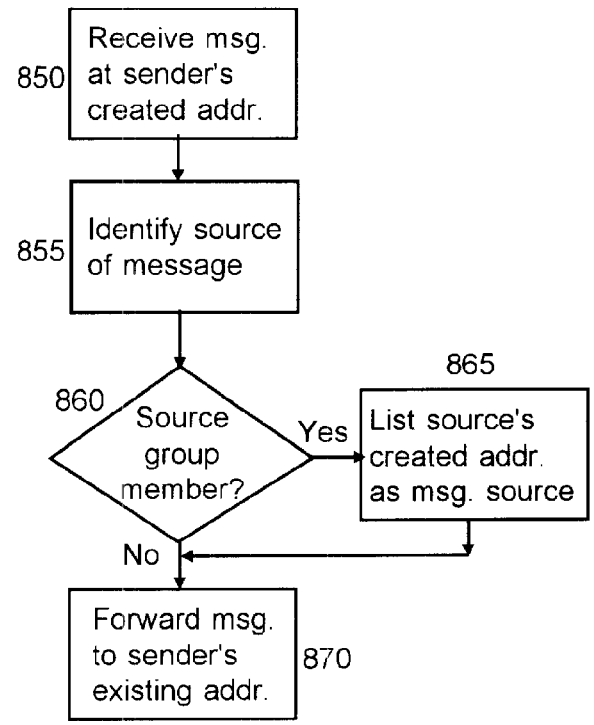

FIGS. 8A and 8B are block diagrams, respectively, of processes used in one or more embodiments of the invention to deliver an e-mail message from a sender to a recipient who has an existing e-mail address, and for delivering a reply from the recipient to the sender.

The process of FIG. 8A may be used, for example, at step 560 of the embodiment of FIG. 5. The process starts after the sender has composed an e-mail message and has selected the desired recipient. The process may also be used, for example, with e-mail messages that have been sent to a mailbox that has been created for a recipient using normal e-mail channels (as opposed to a message that has been created and sent using the user interface provided by the interface server of the invention).

At step 800, an e-mail address using the naming convention of the interface server is created for the sender. For example, if the sender's name is "Joe Smith" and the interface server's domain name is "interfaceserver.com", the address "jsmith@interfaceserver.com" may be created for the sender. More generally, e-mail addresses created for the sender may be of the form "[sendername]@interfaceserver.com."

As is well known to those skilled in the art, e-mail messages may include information about the sender, including the sender's "reply to" and/or "from" e-mail address. The inclusion of the sender's "reply to" e-mail address allows the recipient to easily "reply to" the sender's e-mail message by entering a "reply" command typically provided by e-mail client programs.

In the embodiment of FIG. 8A, at step 805, the sender's existing e-mail address (obtained, for example, from a field in the user interface provided by the interface server, or from "reply to" information extracted from the sender's original e-mail message) and the sender's created address (that was created at step 800) are stored in a contact information database (which may or may not be the same as the contact data base that contains recipient contact information, such as contact data base 115 of FIG. 1). At step 810, the created e-mail address for the sender is added to the sender's e-mail message as the "reply to" address for the email message. If the e-mail message includes a pre-existing "reply to" address for the sender, the existing address is replaced with the created address. For example, if the sender is sending a message from "jsmith123@aol.com" to "drjamesjones@interfaceserver.com", the interface server will replace the sender's original "jsmith123@aol.com" "reply to" e-mail address with the created address, "jsmith@interfaceserver.com". When the recipient replies to the message by using a "reply to" command, the reply message will then be sent to "jsmith@interfaceserver.com" instead of directly to "jsmith123@aol.com." That way, messages between sender and recipient all pass through the interface server, allowing the interface server to modify the "reply to" e-mail addresses of each communication between a sender and recipient such that all messages appear to have come from an e-mail account at the interface server. That helps the interface server build its brand identity and helps promote repeat visits to the interface server's website.

After the created e-mail address has been added as the "reply to" address to the sender's e-mail message at step 810, the e-mail is forwarded to the recipient's existing (active) e-mail address at step 815.

FIG. 8B shows a corresponding process that may be used in one of more embodiments for forwarding a reply message from the original recipient to the original sender. The process may also be used for forwarding any other e-mail messages received at the sender's created e-mail address.

The process starts at step 850 when a message is received by the interface server addressed to the e-mail address that has been created by the interface server for the sender (e.g. "[sendername]@interfaceserver.com"). After the e-mail message is received, the source (sender) of the message is identified at step 855 from sender and "reply to" information contained in the e-mail message. At step 860 a determination is made as to whether the source of the message is a member of the group for which the invention has been implemented, or is otherwise someone for whom an e-mail address has been created at the interface server. Such a determination may be made, for example, by comparing the source information identified at step 855 with information contained in the interface server's contact data base.

If it is determined at step 860 that the source of the e-mail message is someone for whom an e-mail address has been created at the interface server, then at step 865 any "from" and "reply to" information in the e-mail message that specifies a source e-mail address other than the created e-mail address is replaced with the created e-mail address at step 865. For example, assume that the e-mail address "drjbrown@internetserver.com" has been created at the interface server for a Dr. John Brown. Assume further that Dr. John Brown already has a pre-existing address, "jbrown451@aol.com", and used that e-mail address to send the e-mail message, and that "Jbrown451@aol.com" is specified as the "from" and "reply to" addresses in the received e-mail. According to step 865, all references to "Jbrown451@aol.com" in the e-mail message are replaced with the created e-mail address "drjbrown@internetserver.com". Thereafter, the message is forwarded to the sender's existing e-mail address at step 870.

If it is determined at step 860 that the source of the reply message is not a member of the group, the message is forwarded to the recipient at step 870 without any changes being made to the "from" and "reply to" e-mail addresses listed in the e-mail.

Returning to FIG. 5, if it is determined at step 540 that the recipient does not have an active e-mail address, a determination is made at step 545 (again using the information retrieved from the contact data base) as to whether a fax number is known for the recipient. If a fax number is known, the sender's e-mail message is converted to a fax message and is transmitted to the recipients fax machine at step 545. In the embodiment of FIG. 5, a copy of the e-mail message is also sent to the e-mail box that has been created for the recipient at step 548, even though the created e-mail box may not be active (i.e. the e-mail box has not yet been accessed by the recipient). In one or more embodiments, in addition to containing the sender's e-mail message, the fax sent to the recipient at step 547 may include information describing the services provided by the interface server and/or instructions informing the recipient how the recipient may access the recipient's created e-mail box and/or created website. The fax may also provide instructions to the recipient for responding to the fax message. For example, in one or more embodiments, the fax message may specify fax and voice telephone numbers that the recipient can use to send a reply message. In one or more embodiments, voice and/or voice reply messages received at the specified numbers are converted to e-mail messages and forwarded to the original sender's existing email address. In one or more embodiments, the recipient's created e-mail address is inserted as the "reply to" address of any such converted e-mail message.

After the e-mail message has been sent to the recipient via fax at step 547, an e-mail message is sent to the sender at step 549 informing the sender that the sender's e-mail message has been delivered to the recipient via fax.

Figure 7:
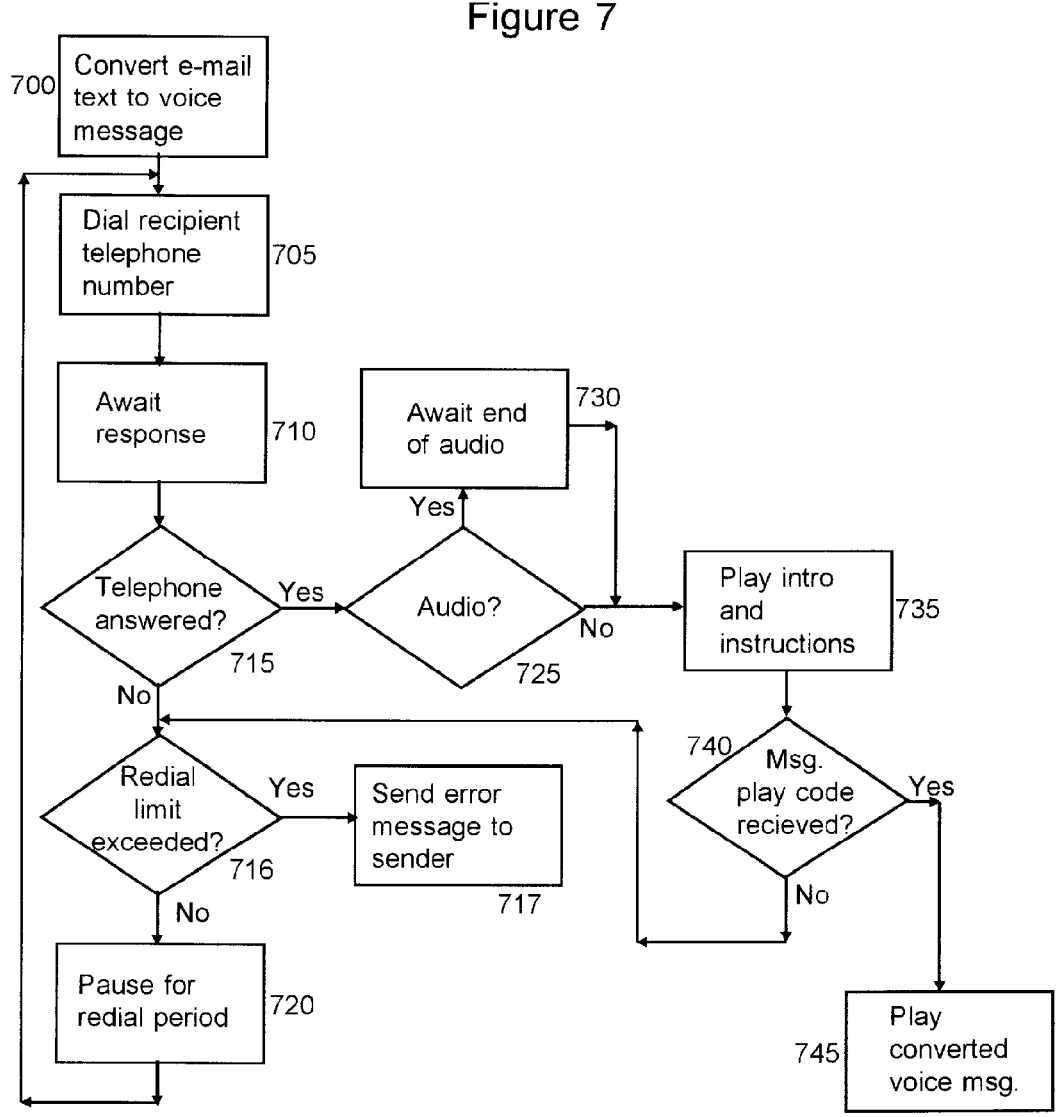
FIG. 7 is a flow chart showing method steps used in an embodiment of the invention.

If no fax number for the recipient is found in the contact information obtained from the contact data base at step 545, the e-mail message is converted to a voice message at step 550 and delivered as a voice message to the recipient's telephone number at step 554. The process for delivering such a voice message in one or more embodiments is illustrated in FIG. 7 and described below. A copy of the e-mail message is delivered to the recipient's created e-mail box at step 556, and an e-mail message is sent to the sender at step 558 informing the sender that the e-mail message has been delivered to the recipient's telephone as a voice mail message. In one or more embodiments, the message sent to the sender at step 558 may include a statement recommending the sender to follow up with a direct telephone call to the recipient's telephone number if the sender does not receive a response to the sender's message within a certain period of time.

FIG. 7 is a block diagram showing steps of an automated process to deliver a sender's e-mail message to the recipient as a voice message that may be used in one or more embodiments of the invention. The method of FIG. 7 may be used, for example, at steps 550 and 554 of the embodiment of FIG. 5.

In the embodiment of FIG. 7, the text of the sender's e-mail message is converted to a voice message at step 700 using text-to-speech conversion techniques that are well known in the art. At step 705, the recipient's telephone number is dialed, and a response is awaited at step 710. In one or more embodiments, a response may consist of a busy signal, an indication that the telephone has been answered, or some other indication of the occurrence of an action at the recipient's end of the telephone line.

At step 715, a determination is made as to whether the response received at step 710 comprises an indication that the recipient's telephone has been answered. If the recipient's telephone has not been answered, the process proceeds to step 716, where a determination is made as to whether a specified redial limit has been exceeded. For example, a redial limit of 10 redial attempts may be used in one or more embodiments of the invention. If the redial limit has been exceeded, an e-mail message is sent to the sender at step 717 informing the sender that the sender's e-mail message could not be delivered at the present time. In one or more embodiments, the e-mail message sent to the sender may include a statement that renewed attempts to deliver the e-mail message will be made at a subsequent time, for example during normal business hours if the e-mail message was originally sent by the sender outside of normal business hours.

If at step 715 it is determined that the redial limit has not yet been exceeded, the process awaits the expiration of a redial period at step 720 before redialing the recipient's telephone number at step 705.

If it is determined at step 715 that the recipient's telephone has been answered, a determination is made at step 725 as to whether audio is being transmitted from the recipient's telephone. Such audio may consist of, for example, of words spoken by a person answering the telephone (e.g. "Dr. Rosen's Office, how may I help you?"), or an audio message delivered by a voice mail system or telephone answering machine.

If it is determined that audio is being transmitted at step 725, the end of the audio transmission (e.g. the telephone answering machine or person finishing the initial voice greeting) is awaited at step 730. Once the audio is completed, the process continues to step 735. If it is determined at step 725 that no audio is being transmitted at step 725, the process proceeds directly from step 725 to step 735.

At step 735, a voice message relating instructions to the recipient is transmitted to the recipient's telephone. For example, in one or more embodiments, the instructions may consist of a statement indicating that a voice message is being delivered to the recipient and prompting the recipient to press one or more buttons on the recipient's telephone (e.g. "Please press *12 if you would like to receive the voice message"). The message may also include instructions informing the recipient how the recipient may retrieve the voice mail message by calling a specified telephone number and keying in specified digits (in case the recipient's telephone is being answered by a voice mail system or answering machine) and/or instructions on how the recipient may reply to the message via telephone, fax, or other means.

At step 740, a determination is made as to whether the message retrieve code specified in the instructions played at step 735 has been transmitted by the recipient within a prescribed time period. If the time period expires without receiving the message retrieve code, the process continues to step 716. If the retrieve code is received at step 740, the voice mail message is delivered at step 745.

Figure 6:
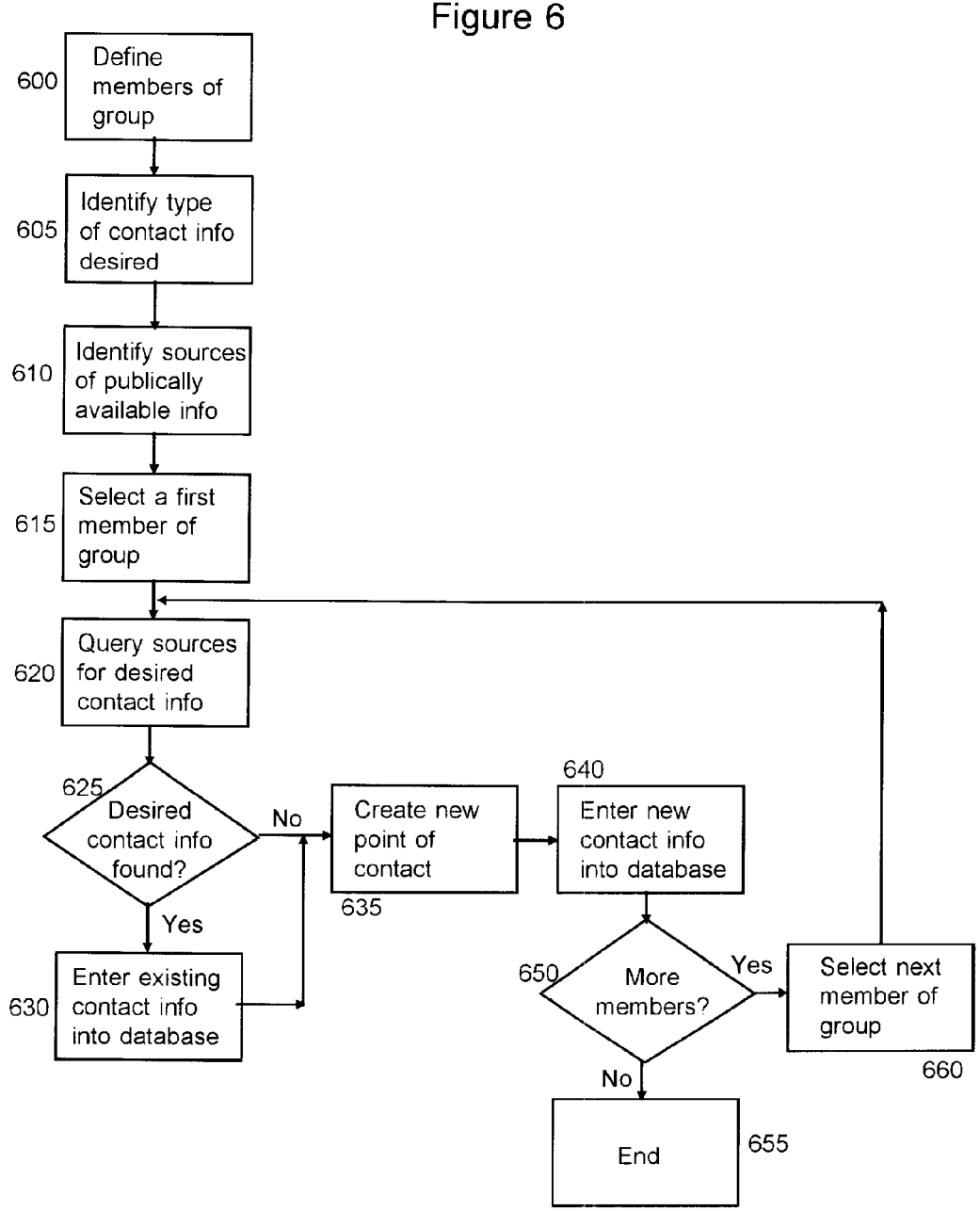
FIG. 6 is a flow chart showing method steps used in an embodiment of the invention.

FIG. 6 is a block diagram showing process steps for setting up a contact data base according to one or more embodiments of the invention. As shown in FIG. 6, the members of the group for which the invention is being implemented and the contact data base is being created are defined at step 600. For example, the members in one embodiment are defined as doctors admitted to practice medicine in the United States. At step 605, the type of contact information desired for the group is identified. For example, in one or more embodiments, the desired contact information for a member includes telephone number, fax number, e-mail address, and website URL.

At step 610, sources of publicly available information for members of the group for which the contact data base is being created are identified. In addition to publicly available information, other sources of information may also be used. For example, if the group for which the invention is being implemented is doctors admitted to practice in the United States, sources of information used may include state boards of health and/or other government and/or non-government agencies that maintain records about medical practitioners.

At step 615, a first member of the group is selected. At step 620, the sources of contact information identified at step 610 are queried for information about the selected member. At step 625 a determination is made as to whether the desired contact information was found. If more than one type of information is being sought, this determination is made, and the succeeding steps are performed, for each type of contact information being sought.

If it is determined at step 625 that the desired contact information has been found, that information is entered into the contact database at step 630. In one or more embodiments, the contact information that has been found may be designated as "existing" contact information. Thereafter, even though the desired contact information has been found, a new "point of contact" (as defined below), is created for the member at step 635. A new point of contact is also created for the member if it is determined at step 625 that the desired contact information is not found at step 625.

As used herein, a "point of contact" means a real or virtual location or mechanism that is set up for a member of a group for which the invention is implemented to allow the member to receive contacts of the type for which contact information is being sought. For example, if the type of contact information that is being sought is an e-mail address, the point of contact may comprise an e-mail account (e.g. a POP mailbox) set up for the member. Similarly, if the type of contact information being sought is the URL of a website, the point of contact may comprise a website set up for the member. For example, in an example embodiment of the invention in which the group for which the invention is being implemented is doctors licensed to practice medicine in the United States, e-mail boxes using a consistent naming convention based on the interface server's URL are created for all doctors in the group, regardless of whether or not a doctor has an existing, different e-mail address and without any assistance from or even knowledge of the doctor. In addition, in such an embodiment, websites may also be created for each doctor that contain non-private information about the doctor, such as the doctor's address, credentials, publications, employment history, etc. An example of a website that may be created in one or more embodiments of the invention is shown in FIG. 9.

The example website of FIG. 9 is a website that may be used in an embodiment of the invention in which the group for which the invention has been implemented is doctors admitted to practice medicine in the United States. The example website of FIG. 9 includes a simple home page 900 that contains background information 910 about the doctor/member (including, in the embodiment of FIG. 9, the member's created e-mail address), as well as rating information 905, and control buttons 915, 920, 925 and 930. In the embodiment of FIG. 9, rating information 905 may be a numerical rating for a member derived from various criteria, including, for example, comments posted by users about the member. In the embodiment of FIG. 9, a user may post a comment by clicking on "Post Comment" control button 925. In one or more embodiments, when "Post Comment" control button is activated, a text entry window is displayed that allows the user to enter a comment or otherwise rate the member. The other control buttons of home page 900 of FIG. 9 invoke other actions. "View map" control button 915 displays a map indicating the location of the member's office. "Return to EVERYMD.COM Homepage" control button 930 returns the user to the interface server's home page. "Send E-mail" control button 920 activates a user interface that allows the user to send an e-mail to the member whose home page is currently displayed. In one or more embodiments, if the member for whom the website is being created has an existing website, home page 900 may also contain a link 935 to the member's existing website.

Returning to FIG. 6, after the new point of contact is created for a member at step 635, contact information for the newly created point of contact (e.g. e-mail address or website URL) is entered into the contact database at step 640. In one or more embodiments, the contact information for the created point of contact is stored together with an identifier that identifies the information as relating to a created, as opposed to a pre-existing, point of contact.

At step 650, a determination is made as to whether there are any additional members of the group for which contact information has not yet been generated. If there are additional members, a next member of the group is selected at step 660, and the process returns to step 620. If there are no further members, the process ends at step 655.

It should be noted that in one or more embodiments of the invention, every member of the group for which the invention is implemented is provided with a website URL and an e-mail address. In one or more embodiments of the invention, website URL's and e-mail addresses are established using a parallel form. For example, in one or more embodiments, e-mail addresses are created in the general form "[first initial] [second initial] [lastname]@interfaceserver.com", and website URL's are established in the general form "[first initial][second initial][lastname].interfaceserver.com" (this form of URL, i.e. xxx.xxx.com, is sometimes referred to as a "third level domain name"). For example, for an embodiment in which the group for which the invention is implemented comprises doctors admitted to practice medicine in the U.S., and for which a URL for the interface server is "everymd.com", the e-mail address for a doctor whose name is John H. Smith may be established as "jhsmith@everymd.com" and the corresponding website URL may be established as "jhsmith.everymd.com". The e-mail address and URL are thus virtually identical. The only difference is that in the URL the "@" symbol of the e-mail address is replaced with a period ("."). Establishing URL's and e-mail addresses in this manner provides easy to remember URL/e-mail address pairs. In a more general embodiment, the URL's are established for members of the group in the form "www.subdomain.domain", while e-mail addresses are established in the form "name@subdomain.domain".

Figure 10:
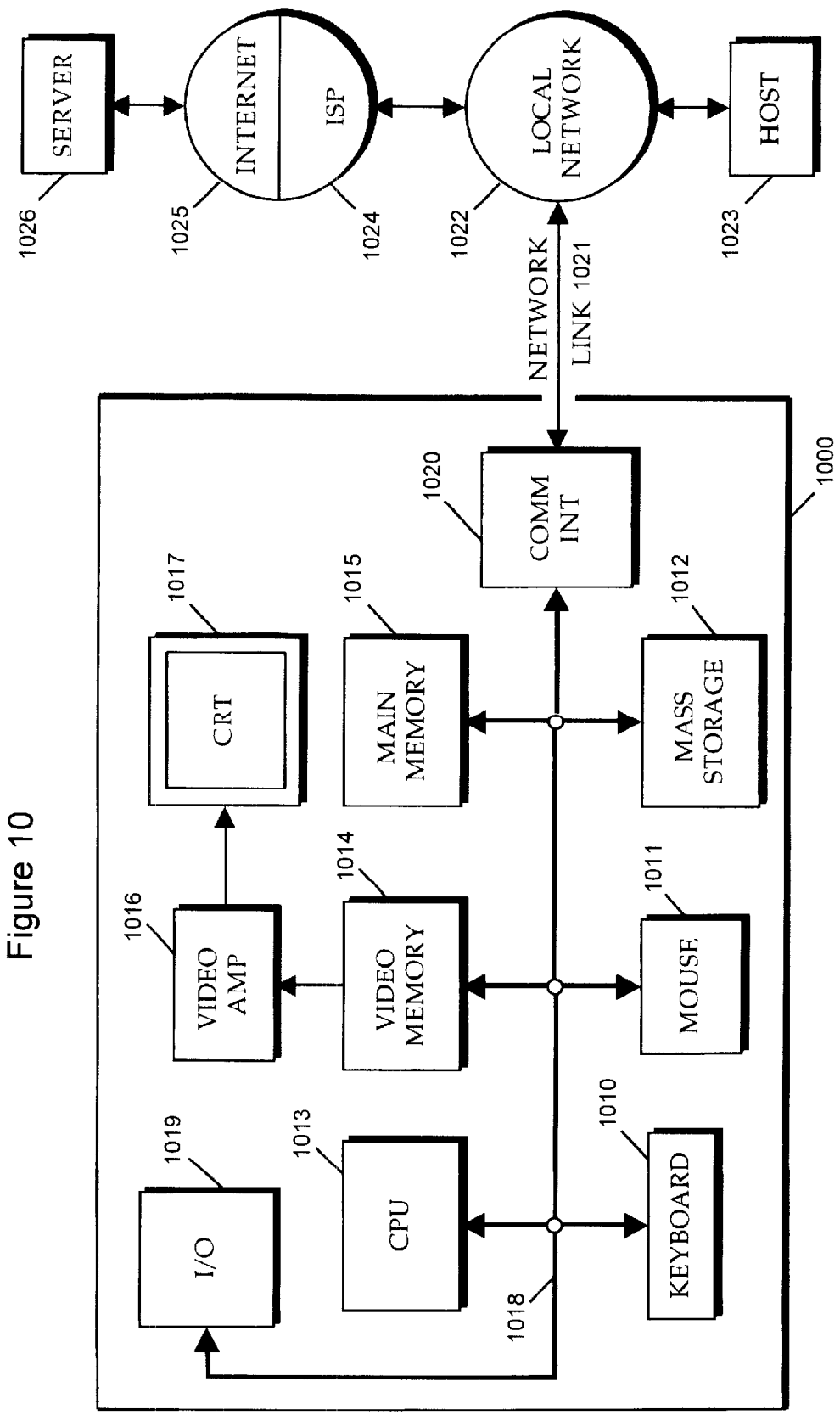
FIG. 10 is a block diagram of a computer system that may be used with one or more embodiments of the invention.

FIG. 10 is a block diagram of a computer system that may be used with one or more embodiments of the invention. The computer system of FIG. 10 may be used, for example, as a user computer, interface server computer, or contact data base server in one or more embodiments of the invention. An embodiment of the invention can be implemented as computer software in the form of computer readable code executed on one or more general purpose computers such as computer 1000 illustrated in FIG. 10, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to processor 1013. Other suitable input devices may be used in addition to, or in place of, the mouse 1011 and keyboard 1010. I/O (input/output) unit 1019 coupled to system bus 1018 represents such I/O elements as a printer, A/V (audio/video) I/O, etc.

Computer 1000 includes a video memory 1014, main memory 1015 and mass storage 1012, all coupled to system bus 1018 along with keyboard 1010, mouse 1011 and processor 1013. The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 64-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 101.7. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1000 may also include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by an Internet Service Provider (ISP) 1024. ISP 1024 in turn provides data communication services through the world wide packet data communication network referred to as the "Internet" 1025. Local network 1022 and Internet 1025 both use electrical, electromagnetic and/or optical signals to carry digital data streams. The signals through the various networks and the signals on network link 1021 and through communication interface 1020, which carry the digital data to and from computer 1000, are exemplary forms of carrier waves transporting the information.

Computer 1000 can send messages and receive data, including program code and HTML code, through the network(s), network link 1021, and communication interface 1020. In the Internet example, remote server computer 1026 might transmit a requested code for an application program or HTML code for a requested webpage through Internet 1025, ISP 1024, local network 1022 and communication interface 1020. In accord with the invention, one such downloaded webpage is a user interface provided by the interface server in an embodiment of the invention.

The received code may be executed by processor 1013 as it is received, and/or stored in mass storage 1012, or other non-volatile storage for later execution. In this manner, computer 1000 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves. The computer systems described above are for purposes of example only. An embodiment of the invention may be implemented in any type of computer system or programming or processing environment.

Thus, a method, apparatus and business system for providing on-line communications with diverse on-line and off-line recipients has been disclosed. Although the invention has been described using certain specific examples, it will be apparent to those skilled in the art that the invention is not limited to these few examples. For example, although the user interface provided by the interface server has been described as being provided to a user via an internet webpage, the interface may be provided in another form. For example, in one or more embodiments, the interface is provided in the form of a voice mail menu system accessed by a user using a telephone instead of a computer or other internet access device. Further, although certain functions have been described herein as being provided by an interface server computer, those functions may be provided by one or more other devices. Other embodiments utilizing the inventive features of the present invention will be apparent to those skilled in the art.

The invention claimed is:

1. A method for providing e-mail communications between a sender and a recipient by a first computer system comprising the steps of:
    said first computer system creating a first created e-mail address for a recipient;
    said first computer system receiving an incoming first e-mail message from a sending entity other than said first computer system comprising a first existing e-mail address of a sender addressed to said first created e-mail address of said recipient;
    said first computer system creating a second created e-mail address for said sender different from said first existing e-mail address and from said first created e-mail address;
    said first computer system creating a first modified e-mail message by replacing said first existing e-mail address in said incoming first e-mail message with said second created e-mail address;
    said first computer system delivering said first modified e-mail message to said recipient;
    wherein said step of said first computer system delivering said first modified e-mail message to said recipient comprises said first computer system sending said first modified e-mail message to a second existing e-mail address of said recipient different from said first created e-mail address of said recipient.

2. The method of claim 1 further comprising the step of:
    said first computer system receiving a second incoming e-mail message comprising said second existing e-mail address from said recipient addressed to said second created e-mail address.

3. The method of claim 2 further comprising the step of:
    said first computer system creating a second modified e-mail message by replacing said second created e-mail address in said second incoming e-mail message with said first existing e-mail address.

4. The method of claim 3 further comprising the step of said first computer system replacing said second existing e-mail address with said first created e-mail address.

5. The method of claim 3 further comprising the step of said first computer system delivering said second modified e-mail message to said sender.

6. The method of claim 5 wherein said step of said first computer system delivering said second modified e-mail message to said recipient comprises said first computer system sending said second modified e-mail message to said first existing e-mail address.

* * * * *